J. DVORAK.
COMBINED LEVEL AND SQUARE.
APPLICATION FILED JAN. 15, 1916.

1,210,370.  Patented Dec. 26, 1916.
2 SHEETS—SHEET 1.

Inventor
J. Dvorak.

By _____, Attorneys.

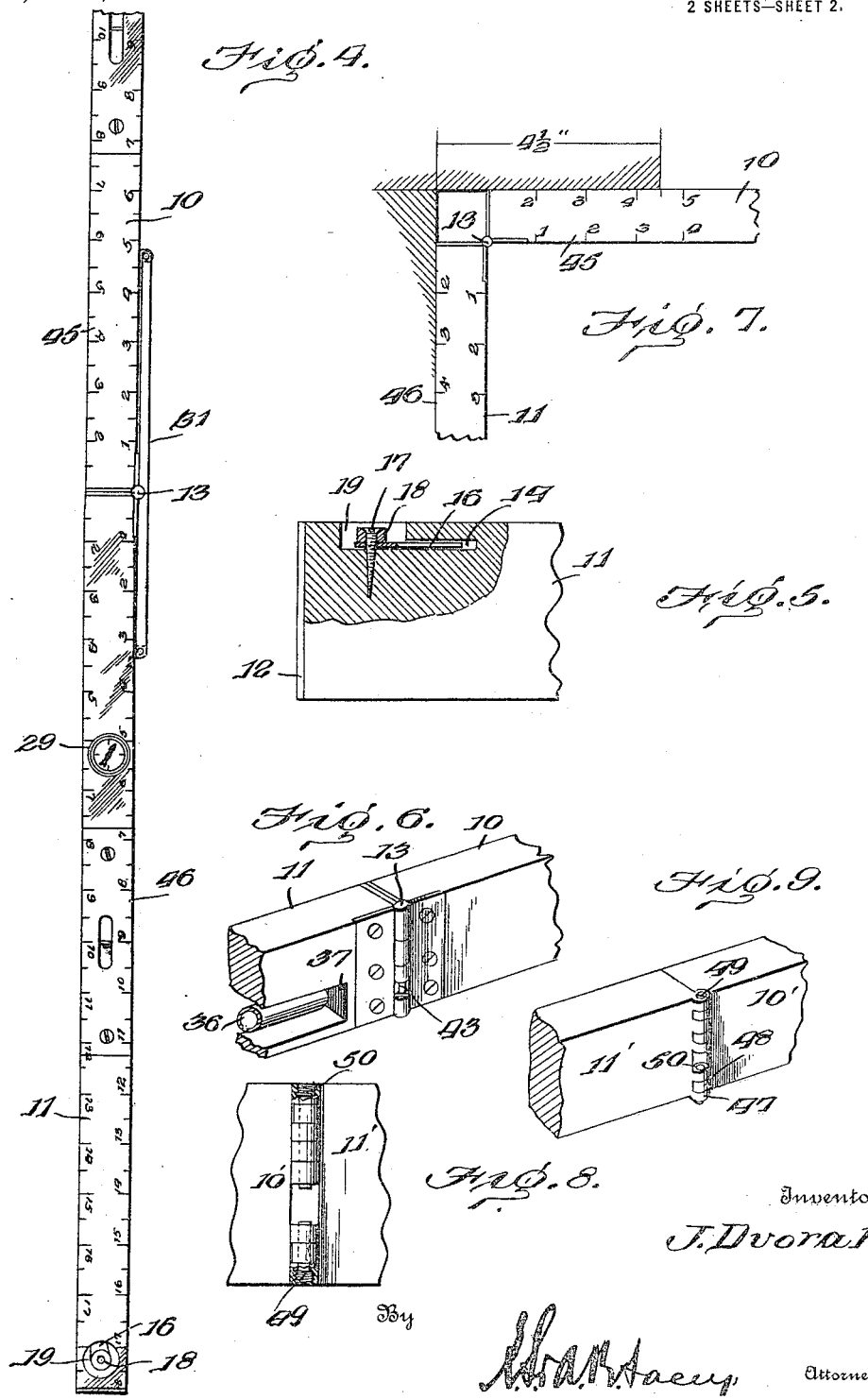

UNITED STATES PATENT OFFICE.

JARSLEY DVORAK, OF MELVIN, IOWA.

COMBINED LEVEL AND SQUARE.

1,210,370.  Specification of Letters Patent.  Patented Dec. 26, 1916.

Application filed January 15, 1916. Serial No. 72,269.

*To all whom it may concern:*

Be it known that I, JARSLEY DVORAK, a citizen of the United States, residing at Melvin, in the county of Osceola and State of Iowa, have invented certain new and useful Improvements in Combined Levels and Squares, of which the following is a specification.

My invention relates to new and useful improvements in levels, the primary object of my invention being the provision of a combined level, square and compass.

A further object of my invention is the provision of a level formed in hinged sections which may be folded against each other when the level is not in use and which may be swung into alinement with each other to increase the effective length of the level and so insure greater delicacy. Because of this, it is possible to construct a level which may be folded into relatively compact form for transportation and storage and which, at the same time, will possess all of the advantages of a level of exceptional length.

A still further object of my invention is the provision of a brace pivoted to one of the hinged sections and having sliding connection with the other, whereby the sections may be clamped at any desired angle to each other, generally at an angle of ninety degrees in order that the instrument may be employed as a square. Obviously, by providing certain scales upon the various faces of the body portions of the level, it is possible to also utilize the level for the purposes of measurement.

A still further object of my invention is the provision of a compass countersunk in the upper face of one of the body sections of the level which may be employed in laying off the lines of walls of buildings and the like.

With these and other objects in view, my invention will be more fully described, illustrated in the accompanying drawings, and then specifically pointed out in the claim which is attached to and forms a part of this application.

Figure 1:
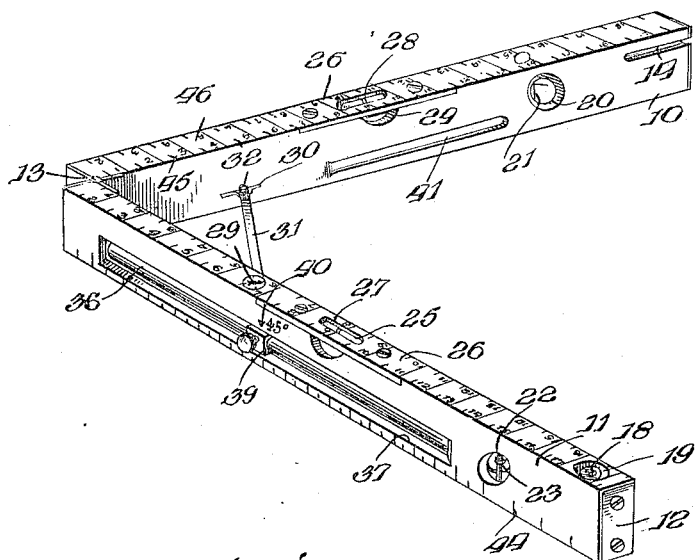
Figure 2:
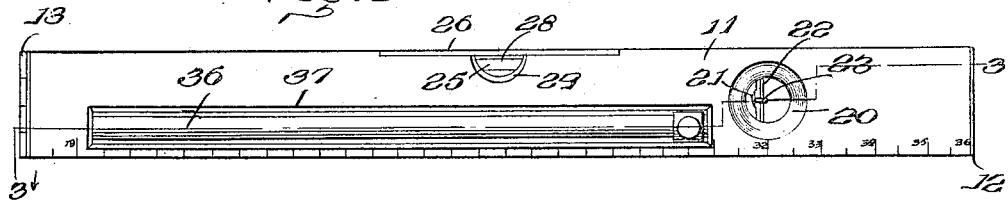
Figure 3:
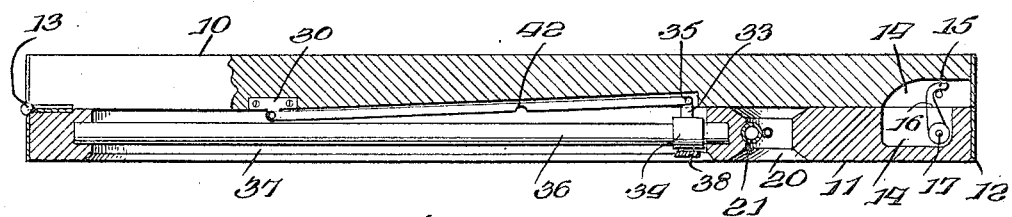

In the drawings: Figure 1 is a perspective view of my improved level with the sections opened up at right angles to each other to permit of its use as a combined level and square; Fig. 2 is a side elevation of the level in folded position; Fig. 3 is a longitudinal sectional view taken on the line 3—3 of Fig. 2, looking in the direction of the arrows; Fig. 4 is a fragmentary top plan view of the level in fully extended position; Fig. 5 is a fragmentary vertical sectional view of the lock mechanism employed in securing the level in folded position; Fig. 6 is a fragmentary perspective view of the hinged connection between the level sections; Fig. 7 is a fragmentary view partially in section and partially in plan, illustrating the use of the level as a square and showing more clearly the arrangement of the scales upon the level for this purpose. Fig. 8 is a fragmentary elevation, partially in section, of a modified form of hinge construction; Fig. 9 is a fragmentary perspective view of the structure shown in Fig. 8.

Corresponding and like parts are referred to in the following description and indicated in all the views of the drawings by the same reference characters.

My improved level, as best shown in Fig. 1 of the drawings, includes two main body sections 10 and 11 which may be formed of wood or metal, as preferred and which, if formed of metal, will be preferably skeletonized for the sake of lightness. If formed of wood, the ends of the sections are preferably reinforced and bound by metallic plates 12 in the manner shown. Preferably, these sections are identical in shape, size and proportions, their various dimensions being standard lengths. For instance, each section, as shown in the drawings, is presumed to be eighteen inches in length, two inches in height and one inch in thickness. Because of this, certain commonly used measurements may be made with the level without reference to any scales inscribed thereon. The sections are hingedly connected by a hinge 13, the leaves of which are countersunk in the side faces of the sections in order that the sections may fold smoothly against each other when the level is not in use. The inner faces of both sections, adjacent their free ends are formed with horizontally disposed slots 14 which form continuations of each other when the sections are folded together, and a pin 15 is passed vertically across one of these slots. An L-shaped hook 16 is pivotally supported in the other slot upon a pivot screw 17 for engagement with the pin 15 and is operable by means of a head 18 at its pivoted end which projects into a socket 19 formed in the upper face of the section in which it is mounted. Obviously, this hook may be swung to engage the pin 15 when the sections are folded against each other to lock the sections together or swung to rest wholly in the slot 14 of the section in which it is pivoted when the level is in use.

Each level section, in spaced relation to its free end, is provided with the usual transverse sight opening 20 through which the intermediate portions of vertically disposed bubble tubes 21 are exposed, these being the tubes used when the level is employed in determining whether walls or like structures are vertical or not. Wires 22 extend in parallel spaced relation to these bubble tubes and across the sight openings and are provided centrally with beads 23 in order to facilitate accurate determinations of the positions of the bubbles in the tubes. In like manner, the intermediate portion of each section of the level is provided with a transverse sight groove 24 in its upper face to receive the horizontally disposed bubble tubes 25 which are protected by metal plates 26 countersunk in the upper faces of the level sections, these plates being formed with longitudinal sight openings 27 through which the position of the bubbles may be determined. U-shaped sights 28 bridge the intermediate portions of these bubble tubes in order to facilitate their reading.

The upper face of one of the sections of the level, in the present instance, the section 11, is formed with a cylindrical recess to receive the cylindrical casing of a compass 29, best shown in Figs. 1 and 4 of the drawings and the purpose of which will be later more fully explained.

The inner face of one of the body sections, as for instance the section 10, is formed in spaced relation to its hinged end with a longitudinal slot to receive a horizontally disposed hinge plate 30 which, with the exception of a hinge ear, lies flush with the face of the section 10. A brace rod 31 has one end bifurcated to provide spaced ears to straddle the ear of this hinge plate 30 and is swingingly connected to the hinge plate by a pintle pin 32. The opposite end of this rod 31 is similarly bifurcated to straddle the laterally directed ear 33 of a guide block 34, being connected to this ear by a pintle pin 35. This guide block is formed with a bore, whereby it is slidably mounted upon a guide rod 36 extending longitudinally of the other level section 11 which is formed intermediate its height with a longitudinal slot 37 extending throughout the greater portion of the length of the section and completely through it, as best shown in Fig. 3. A clamping screw 38 is threaded through this guide block 34 for clamping engagement with the guide rod 36 at any desired relative adjustment of the two level sections.

Preferably, the upper face of the guide block is provided with a transverse line 39 adapted to be brought into alinement with an arrow or similar inscription 40 upon the section 11 to thereby indicate when the two sections have been swung at right angles to each other in order that the sections may be clamped in such position and the device employed as a square. Obviously, additional arrows may be disposed throughout the length of the slot to indicate when the sections are swung at other predetermined angles to each other, if desired. The inner face of the section 10 of the level is, of course, provided with a longitudinal groove 41 to partially seat the brace rod 31 when the level is folded and, as shown in Figs. 3 and 6, this brace rod, intermediate its length is grooved transversely at 42 and certain of the hinge ears of the hinge 13 are cut-away, as shown at 43, in order that the brace rod may rest flatly against the inner faces of the level sections when the latter are swung into alinement with each other, the notch or groove 42 engaging about the exposed pintle pin of the hinge 13, as shown in Fig. 4.

Any suitable arrangement of scales may be inscribed upon any or all of the faces of the level, as desired. Preferably, the outer faces of the level sections are provided with what forms a continuous scale when the sections are swung into alinement with each other, the scale beginning at the free end of the section 10 and ending at the free end of the section 11 and being indicated at 44. With the level illustrated, which, when extended, is thirty-six inches long, this scale is shown divided into inches and fractions thereof. Upon the upper faces of the level sections I preferably provide additional scales which may be employed when the sections are folded and which also may be employed when the device is utilized as a square. Preferably, each of these sections is provided with its own independent scales which also preferably read from their hinged ends to their free ends. Along the inner edges of the upper faces, I provide scales 45 reading from the inner to the free ends of the sections and divided into inches, as shown. Along the outer edges of the upper faces, I provide scales 46 also reading from the inner to the outer ends of the sections and divided into inches. It should be noted, however, that the outer scales, instead of having their first inch divisions marked 1 have them marked 2 in order to provide for the thickness of the other scale section when the device is used as a square, as will be readily appreciated from a consultation of Fig. 7. As there shown, when the device is inserted in a corner, the outer scale may be employed to read distances from the angle in which the instrument is inserted, while when the instrument is positioned about a corner, the inner scale may be similarly employed.

From the foregoing description, taken in connection with the drawings, the methods of employing my improved level and square will be readily understood and no description is necessary. Obviously, the intended line of direction of a wall or other structure to be built may be laid out by mounting the level in proper horizontal position and bringing it into proper angular position by means of the compass to permit sighting along the upper edge of the level in the desired direction and to thus permit determination of various points along the desired line of construction.

Although I have illustrated and described my invention in all its details of construction, it will of course be understood that I am not limited to such details as various minor changes, within the scope of the appended claim, may be made at any time without in the slightest degree departing from the spirit of my invention. For instance, the level sections 10' and 11' in Figs. 8 and 9, if formed of metal, may be constructed with integrally formed pintle ears 47 and 48 for intermating engagement and adapted to receive pintle pins 49 and 50. One or more of these ears are omitted to provide space for the brace rod 31, not shown, and it is for this reason that two pintle pins are employed. Because of this arrangement an absolutely flat surface is provided for the brace rod to engage against when a level is in extended position and no notching of the brace rod is required. To prevent displacement of the pintle pins their outer ends are preferably threaded to seat in threaded sockets formed in the outermost of the pintle ears in the manner shown in Fig. 8.

Having thus described the invention, what is claimed as new is:

A combined level and square including hingedly connected level sections, each provided with bubble tubes and sight openings, a brace hingedly connected at one end to one section, the opposite section being formed longitudinally with a slot, a guide rod extending throughout the length of the slot, a guide block slidably mounted upon the rod, means for clamping the guide block at any desired point along the rod, and pivotal connection between the free end of the brace and guide block.

In testimony whereof, I affix my signature.

JARSLEY DVORAK. [L. S.]